Sept. 23, 1952     T. F. M. WILLIAMSON     2,611,567
INSULATED PIPE ANCHOR
Filed March 18, 1946
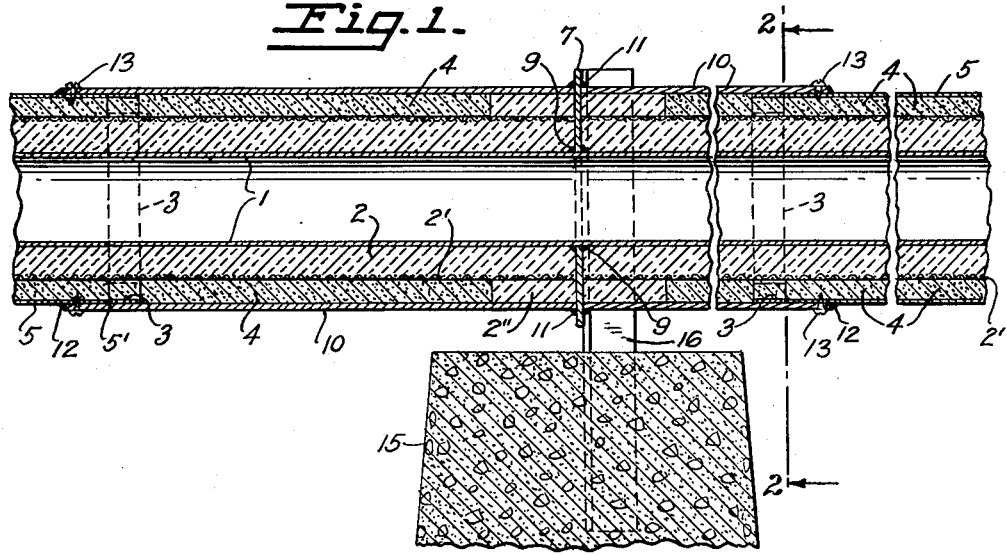
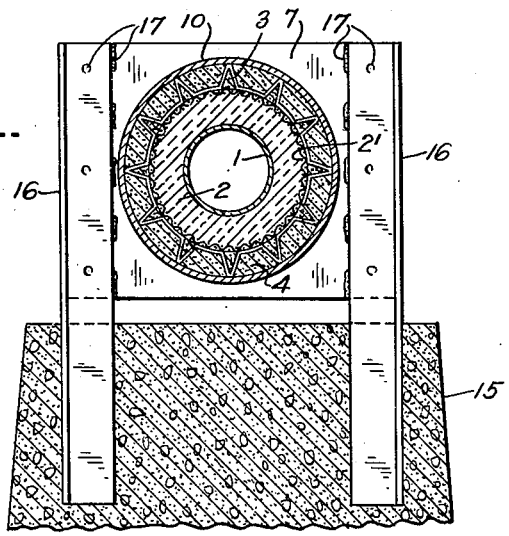
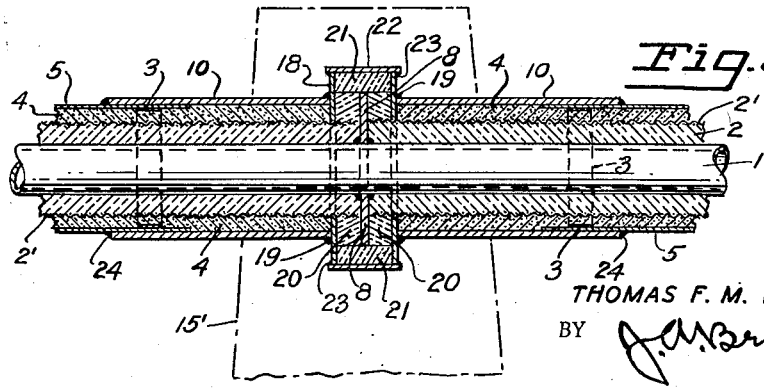
INVENTOR.
THOMAS F. M. WILLIAMSON
BY
ATTORNEY Patented Sept. 23, 1952

2,611,567

UNITED STATES PATENT OFFICE 2,611,567

INSULATED PIPE ANCHOR

Thomas F. M. Williamson, San Francisco, Calif., assignor to Alexander H. Isenberg, Woodside, Calif.

Application March 18, 1946, Serial No. 655,294

3 Claims. (Cl. 248—49)

This invention relates to thermal insulated pipe of the general type wherein a metal pipe is surrounded with thermal insulation, and preferably surrounding this is a heavy layer of water sealing compound such as solid asphalt, tar, or pitch, and a metal or other casing surrounds the pitch (all as generally shown in my Patents Nos. 2,478,552 and 2,532,587) and the present invention has for its principal object the provision of means for anchoring the inner metal pipe of the assembly so that all longitudinal expansion and contraction of the pipe in use will take place on one or both sides of the anchored point.

Other features and advantages of the invention will appear in the following description and accompanying drawings.

In the drawings—

Fig. 1 is a longitudinal section of an insulated pipe of the character described and showing my novel anchorage arrangement applied thereto.

Fig. 2 is a cross section of the assemblage taken along the line 2—2 of Fig. 1.

Fig. 3 is a view similar to that of Fig. 1 but showing a modified form of the anchoring arrangement.

In the drawings, 1 is the inner pipe, generally a steam conducting pipe or one used for conveying other relatively hot or cold fluids, 2 is the thermal insulation closely surrounding the pipe, and which may be of any suitable kind of thermal insulating material, tho preferably is the conventional magnesia base steam pipe packing applied in split sections to the pipe and wrapped with one or more layers 2' of cloth, 4 is a thick layer of solid asphalt, tar, pitch, or the like which surrounds the thermal insulation to prevent the ingress of water, 5 is the sheet metal tubular casing which surrounds the pitch, while 3 is one of any type of spacer or spacing ring used at intervals along the assemblage to definitely space the sheet metal casing 5 from the thermal insulation to provide a space for longitudinal and circumferential flow of the pitch 4, and which is poured in while in molten condition through the end of the space or through one or more side openings in the casing, not shown, but well understood in the art.

All the above features are old and well known, and my improvement applied thereto comprises a piece of metal such as a substantially rigid anchor plate of steel (7 in Figs. 1 and 2, and 8 in Fig. 3) extending at right angles or transversely to the pipe and casing, and which plate may be in one or two pieces, provided with a central opening or notches to pass conducting pipe 1 therethrough, said pipe being firmly welded thereto as at 9.

Steel plate 7 may be round or rectangular or any other shape, an oblong form being shown for the plate in Fig. 2, and which plate is of a size to extend outward beyond the casing 5, which may be cut back to terminate some distance from the plate 7 as indicated at 5', while abutting the plate 7 at opposite sides are two relatively short lengths of heavy steel tubes or sleeves, such as well casing 10 preferably of an internal diameter to fit and telescope nicely or snugly over the ends of the casing 5 for a distance as indicated in Fig. 1. Sleeves 10 are welded at their inner opposed confronting ends to plate 7 as at 11, and welded or soldered at their outer ends to the molding casing 5 as at 12, and additionally may be screwed or spot welded as at 13, to the casing ends which they overlap, so as to make a waterproof joint. The plate 7 and the tubular sleeves 10 are preferably all galvanized so as to form a rust proof permanent anchor unit.

Within the anchor unit the asphalt or pitch layer 4 is terminated a short distance from anchor plate 7 and the space packed with additional thermal insulation 2'', preferably before applying the sleeves. This is done to prevent transmitting heat to the asphalt. Preformed block insulation may be used if desired.

Obviously the construction thus far set out could be embedded in any concrete wall or block to form an anchor for the pipe 1, but I prefer to pass the pipe assembly over or free of embedding in a suitable concrete anchor block 15 as shown in Figs. 1 and 2 and project iron or steel legs 16 at opposite sides of the conduit unit into the concrete and which legs are welded or otherwise fixedly secured as at 17 to the projecting plate 7, as this permits of easier removal should it ever be required, as the legs are of substantially less width than the width of the plate and may be easily cut off with a torch.

After the anchorage is completed as shown in the drawings the unit is preferably covered with finely divided thermal insulating material such as crushed kieselguhr or the like, and the earth fillings applied.

While the anchorage plate 7 is directly connected with the steam conducting pipe in the design shown in Figs. 1 and 2, nevertheless with the completed installation there is but little thermal loss.

In the modified form shown in Fig. 3 the anchor plate 8 is thermally insulated from the outside, as the plate terminates within an enlarged housing joining the inner ends of a pair of sleeves 10. This housing comprises a pair of heavy steel plates 18, round, square, or oblong, which are respectively welded as at 19 to the sleeves 10 and spaced apart from anchor plate 8 by relatively hard, preferably pre-formed, blocks 20, 21 of thermal insulation hermetically sealed within the housing by a cover 22 welded in place as at 23.

Plates 18 preferably, tho not necessarily, project inward to contact and embrace the thermal packing 2, and the asphalt filling 4 preferably extends to and is sealed to the outsides of the plates 18, and inner surface of sleeves 10 as by pouring through suitable openings (not shown and later closed). The outer ends of the sleeves 10 preferably telescope over the casing ends 5 and are soldered or welded thereto as at 24.

With such a construction, it will be seen that any anchoring of the projecting housing 18—22 against longitudinal movement will also lock the pipe 1 against such movement, even tho thermally insulated therefrom.

Such anchoring of the housing may be carried out with legs or extensions welded to the housing projecting into the concrete anchor block as explained and shown for Figs. 1 and 2, or a concrete anchor block 15' may be extended upwardly to engage or even surround the housing 18—22 as indicated in Fig. 3 if desired.

Having thus described two modifications of my improved anchorage means for insulated pipe, it will be obvious that while I show it applied to an assembly containing but one pipe, it is equally applicable to such assemblies containing more than one pipe as shown in my said copending application above mentioned, it being also obvious that various changes of detail may be made within the scope of the invention and my appended claims.

I claim:

1. In a conduit pipe assembly having a conduit unit including an exteriorly thermally insulated metal conducting pipe enclosed in spaced relation within a relatively thin sheet metal tubular outer casing and a jacket of moisture impervious material therebetween, an anchorage means comprising a metal plate having an opening therethrough through which the conducting pipe passes, said plate being secured to said conveyor pipe to prevent relative movement therebetween and said plate extending transversely of the conduit radially outwardly beyond the diameter of the casing, a pair of relatively short sleeves of thicker body material than said casing, each of which at one of its ends abuts the respective opposite sides of the plate and at its other end snugly telescopes an adjacent end of the casing, said sleeves being imperviously sealed to the plate at their opposed confronting ends and sealed at their opposite ends to the adjacent casing, the moisture impervious material terminating in spaced relation to said anchor plate, and thermal insulating material in the space between the anchor plate and the adjacent terminal end of the moisture impervious material.

2. In a conduit pipe assembly, a conduit unit including an exteriorly thermally insulated metal conducting pipe enclosed within a moisture impervious jacket of material which is fluid when heated and solidifies when cooled to normal temperature, said jacket being surrounded by a tubular outer casing, circumferential spacer means disposed between the inner insulated conducting pipe and the casing and having open spaces therethrough through which the jacket material may be flowed longitudinally within the casing, an anchorage means comprising a metal plate transversely of the conduit unit and having an opening therein through which the conducting pipe passes, said plate being secured to said conducting pipe to prevent relative movement therebetween and said plate extending radially outwardly beyond the diameter of the casing, the casing and the moisture impervious jacket having an end terminating short of contact with said plate, a pair of relatively short sleeves of thicker body material than said casing, each of said sleeves at one of its ends abutting the respective opposite sides of the plate and at its opposite end telescoping an adjacent end of the casing, said sleeves being imperviously sealed to the plate at their opposed confronting ends and sealed at their opposite ends to the adjacent casing, and thermal insulation within said sleeves between opposite faces of said plate and the respective adjacent ends of the moisture impervious jacket.

3. In a conduit pipe assembly having an anchorage plate extending transversely of the conduit radially outwardly for embedding in an exterior foundation, a conduit unit including an exteriorly thermally insulated conducting pipe enclosed in spaced relation within a relatively thin tubular outer casing, circumferential spacer means between the inner thermally insulated conducting pipe and the outer casing, the spacer means having openings therethrough longitudinally of the conduit, a moisture impervious jacket in the space between the casing and the insulated inner conducting pipe, the anchor plate being fixedly secured to said conducting pipe, and the said casing and moisture impervious jacket terminating in spaced relation to the opposite sides of the anchor plates, a tubular sleeve of thicker body material than said casing fixedly sealed to each of the opposite faces of the anchor plate and extending therefrom and circumferentially enclosing the adjacent end portion of the thinner casing and moisture impervious jacket, and thermal insulation within said sleeve between the anchor plate and the adjacent ends of the moisture impervious jacket.

THOMAS F. M. WILLIAMSON.

REFERENCES CITED

The following references are of record in the file of this patent:

UNITED STATES PATENTS

| Number | Name | Date |
|---|---|---|
| 2,081,867 | Gysling | May 25, 1937 |
| 2,360,067 | McLeish | Oct. 10, 1944 |

FOREIGN PATENTS

| Number | Country | Date |
|---|---|---|
| 563,222 | Germany | Sept. 28, 1930 |